United States Patent
Di Miro et al.

(10) Patent No.: US 10,465,625 B2
(45) Date of Patent: Nov. 5, 2019

(54) METHOD FOR MONITORING AN EXHAUST-GAS SENSOR

(71) Applicant: Robert Bosch GmbH, Stuttgart (DE)

(72) Inventors: Ariel Di Miro, Stuttgart (DE); Dorde Stojicevic, Fellbach (DE); Robert Seyfang, Ingersheim (DE); Bastian Roetzler, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 269 days.

(21) Appl. No.: 15/545,940

(22) PCT Filed: Nov. 18, 2014

(86) PCT No.: PCT/EP2014/074863
§ 371 (c)(1),
(2) Date: Jul. 24, 2017

(87) PCT Pub. No.: WO2015/082208
PCT Pub. Date: Jun. 11, 2015

(65) Prior Publication Data
US 2018/0058361 A1     Mar. 1, 2018

(30) Foreign Application Priority Data

Dec. 5, 2013   (DE) .................. 10 2013 225 050
Nov. 17, 2014  (DE) .................. 10 2014 223 444

(51) Int. Cl.
*F02D 41/14*     (2006.01)
*F02D 41/22*     (2006.01)
(Continued)

(52) U.S. Cl.
CPC ............ *F02D 41/222* (2013.01); *F01N 11/00* (2013.01); *F01N 11/002* (2013.01);
(Continued)

(58) Field of Classification Search
CPC ............ F02D 41/1494; F02D 41/1495; F02D 41/222; F01N 11/002; F01N 11/005;
(Continued)

(56) References Cited

U.S. PATENT DOCUMENTS 7,526,914 B2 *  5/2009  Nakano .................. F01N 3/021
                                            123/672
9,702,836 B2 *  7/2017  Nishijima ........... F02D 41/1446
(Continued)

FOREIGN PATENT DOCUMENTS

DE    102008040593 A1    9/2009
DE    102009003091 A1    11/2010
(Continued)

OTHER PUBLICATIONS

International Search Report dated Mar. 30, 2015, of the corresponding International Application filed Nov. 18, 2014.

*Primary Examiner* — Erick R Solis
(74) *Attorney, Agent, or Firm* — Norton Rose Fulbright US LLP; Gerard Messina

(57) ABSTRACT

A method for monitoring an exhaust-gas sensor in which it is determined whether at least one monitored event has occurred by evaluating at least one heat quantity supplied to and/or withdrawn from the exhaust-gas sensor during a period of time, in particular under consideration of a change in the heat quantity stored by the exhaust-gas sensor that occurs during the period of time.

11 Claims, 2 Drawing Sheets

(51) Int. Cl.
*F01N 11/00* (2006.01)
*F01N 13/00* (2010.01)

(52) U.S. Cl.
CPC .......... *F01N 11/005* (2013.01); *F01N 11/007* (2013.01); *F01N 13/008* (2013.01); *F02D 41/1441* (2013.01); *F02D 41/1444* (2013.01); *F02D 41/1494* (2013.01); *F02D 41/1495* (2013.01); *F01N 2560/20* (2013.01); *F01N 2900/0416* (2013.01); *F01N 2900/1404* (2013.01); *F01N 2900/1602* (2013.01); *F01N 2900/1631* (2013.01); *Y02T 10/40* (2013.01); *Y02T 10/47* (2013.01)

(58) Field of Classification Search
CPC ............... F01N 11/007; F01N 2550/22; F01N 2900/0416; F01N 2900/1404; F01N 2900/1602; F01N 2900/1631

USPC ................ 701/107, 109; 123/688, 689, 690; 73/114.71, 114.72, 114.73
See application file for complete search history.

(56) References Cited

U.S. PATENT DOCUMENTS

2011/0301908 A1* 12/2011 Magarida .............. F01N 11/002
702/130
2016/0032812 A1* 2/2016 Lee ..................... F02D 41/1441
73/114.73
2017/0248061 A1* 8/2017 Martin .................. F01N 11/002

FOREIGN PATENT DOCUMENTS

DE 102009028288 A1 2/2011
DE 102011002502 A1 2/2012

* cited by examiner

METHOD FOR MONITORING AN EXHAUST-GAS SENSOR

BACKGROUND INFORMATION

The present invention relates to a method for monitoring an exhaust-gas sensor, in which it is monitored whether at least one monitored event has occurred. Examples of such events, for instance, are clogging of an access path of the exhaust gas to the exhaust-gas sensor or the immersion of the exhaust-gas sensor in a fluid.

Pertinent methods in the related art are, at best, based on empirical algorithms and are therefore correspondingly tainted by error in certain situations.

SUMMARY

The present invention provides a method for monitoring an exhaust-gas sensor in which it is determined whether at least one monitored event has occurred This is done by evaluating at least one heat quantity supplied to the exhaust-gas sensor during a time period and/or withdrawn from the exhaust-gas sensor during said time period, in particular taking into account a change in the heat quantity stored by the exhaust-gas sensor during the time period.

In this way it is ensured that the exhaust-gas sensor and its environment are correctly monitored on the basis of relevant physical quantities and that the occurrence of the at least one monitored event is thus able to be determined in a reliable manner.

The monitored event in particular involves an event that goes hand in hand with a thermal effect on the exhaust-gas sensor, such as a reduced or an increased heat dissipation. For instance, it may involve clogging of a gas inlet opening of the exhaust-gas sensor by a solid medium, or it may concern flooding of the exhaust-gas sensor by a fluid medium such as it may occur when the motor vehicle equipped with an internal combustion engine is driving through high water.

According to further refinements of the present invention, the evaluation takes place with the aid of an energy balance equation or with the aid of a conservation of energy law.

In this context, a consideration of a change in the heat quantity stored by the exhaust-gas sensor that occurs during the time period is provided as an option. It may be dispensed with, for instance when it is known that it is constant, e.g., when the temperature of the exhaust-gas sensor is regulated to a constant value.

The determination of the heat quantity stored by the exhaust-gas sensor may be realized with the aid of a device for measuring the temperature that is encompassed by the exhaust-gas sensor. For example, an electrical DC and/or AC resistance of the exhaust-gas sensor may be measured toward that end.

The heat quantities supplied to and/or withdrawn from the exhaust-gas sensor are able to be ascertained or calculated from additional measured quantities in particular, especially on the basis of corresponding models and/or datasets. In addition to the exhaust-gas sensor temperature, such quantities may be the following: the ambient temperature, a flow velocity in the environment, the chemical composition of the environment, an amperage and a time characteristic of an electric current flowing through the exhaust-gas sensor, and operating conditions of an internal combustion engine in whose exhaust tract the exhaust-gas sensor is situated.

These quantities may be measured either separately or in turn be ascertained from other quantities, such as already known operating variables of an internal combustion engine.

In particular, the heat quantities supplied to and/or withdrawn from the exhaust-gas sensor may involve one or more or all of the following heat quantities:

A heat output of an electrical heating device of the exhaust-gas sensor. It may be calculated from an effectively applied heater voltage and a heater resistance, for example. The heater resistance may in turn be taken into account as a function of the exhaust-gas sensor temperature.

A heat dissipation between the exhaust-gas sensor and its environment. The environment, for example, may be the wall of an exhaust-gas line in which the exhaust-gas sensor is installed. For instance, it may be assumed that the heat dissipation between the exhaust-gas sensor and its environment is a function of the temperature of the exhaust-gas sensor and the ambient temperature. It may be assumed, for example, that the heat dissipation between the exhaust-gas sensor and its environment is a function of the temperature differential.

A heat convection between the exhaust-gas sensor and its environment. The environment, for instance, may be the exhaust gas in an exhaust-gas line in which the exhaust-gas sensor is installed. For example, it may be assumed that the heat convection between the exhaust-gas sensor and its environment is a function of the temperature of the exhaust-gas sensor and the ambient temperature as well as of the flow velocity of a gas of the environment.

A heat radiation between the exhaust-gas sensor and its environment. The environment, for example, may be the wall of an exhaust-gas line in which the exhaust-gas sensor is installed. For example, it may be assumed that the heat radiation between the exhaust-gas sensor and its environment is a function of the temperature of the exhaust-gas sensor and the ambient temperature.

The heat quantities ascertained in this manner may be ascertained in particular under the assumption that the event to be monitored is currently not occurring or has not occurred during the past time interval.

It is furthermore possible to compare the heat quantities supplied to or withdrawn from the exhaust-gas sensor with the heat output of the electric heating device of the exhaust-gas sensor, disregarding a possible heat output, however, and taking a change in the heat quantity stored by the exhaust-gas sensor into account. Based on this comparison, it may then be inferred whether the at least one monitored event has occurred.

The result of the evaluation in particular may be that the heat output is currently, or has been in the past time interval, greater than the sum of the considered heat flows plus the considered change in the thermal energy stored in the exhaust-gas sensor. In this case, additional cooling of the exhaust-gas sensor therefore exists. For example, flooding of the exhaust-gas sensor may be inferred in such a case.

The result of the evaluation in particular may be that at present or during the past time interval, the electric heat output is/was less than the sum of the considered heat flows plus the considered change in the thermal energy stored in the exhaust-gas sensor. This means that currently or during the past time interval, the effects cooling the exhaust-gas sensor are overvalued, meaning, for instance, that cooling of the exhaust-gas sensor that should actually be expected is not taking place. In such a case, for example, it may be inferred that clogging of a gas inlet opening of the exhaustgas sensor by a solid medium is present. For example, a sheath tube of an exhaust-gas sensor, in particular a particle sensor, may be clogged with particles.

It may furthermore be provided that the at least one monitored event is ageing of the exhaust-gas sensor.

Moreover, it may be provided that in view of the ageing of the exhaust-gas sensor, a model parameter for calculating a heat quantity supplied to the exhaust-gas sensor and/or withdrawn from the exhaust-gas sensor is adapted, in particular a parameter that describes a heater resistance.

It may furthermore be provided that the evaluation as to whether the at least one monitored event has occurred takes place on the basis of the comparison of a predefined value with a measure obtained by a time integration over a heat output. In particular, this may involve a temporally and/or energetically normalized measure. It may especially involve a temporally and/or energetically normalized time integral of a square of a heat output. The heat output in particular is a difference from a modeled heat output supplied to the exhaust-gas sensor and modeled heat loss rates of the exhaust-gas sensor.

Notwithstanding that the feature "electrical heat output" turns up in the framework of this application, the present invention is by all means also implementable in the case of exhaust-gas sensors without an electrical heating device. In this case, the value of the electric heat output assumes the zero value. In all other respects, the method according to the present invention is carried out unchanged.

Below, exemplary embodiments of the present invention are described with reference to the figures.

DETAILED DESCRIPTION OF EXAMPLE EMBODIMENTS

Figure 1:
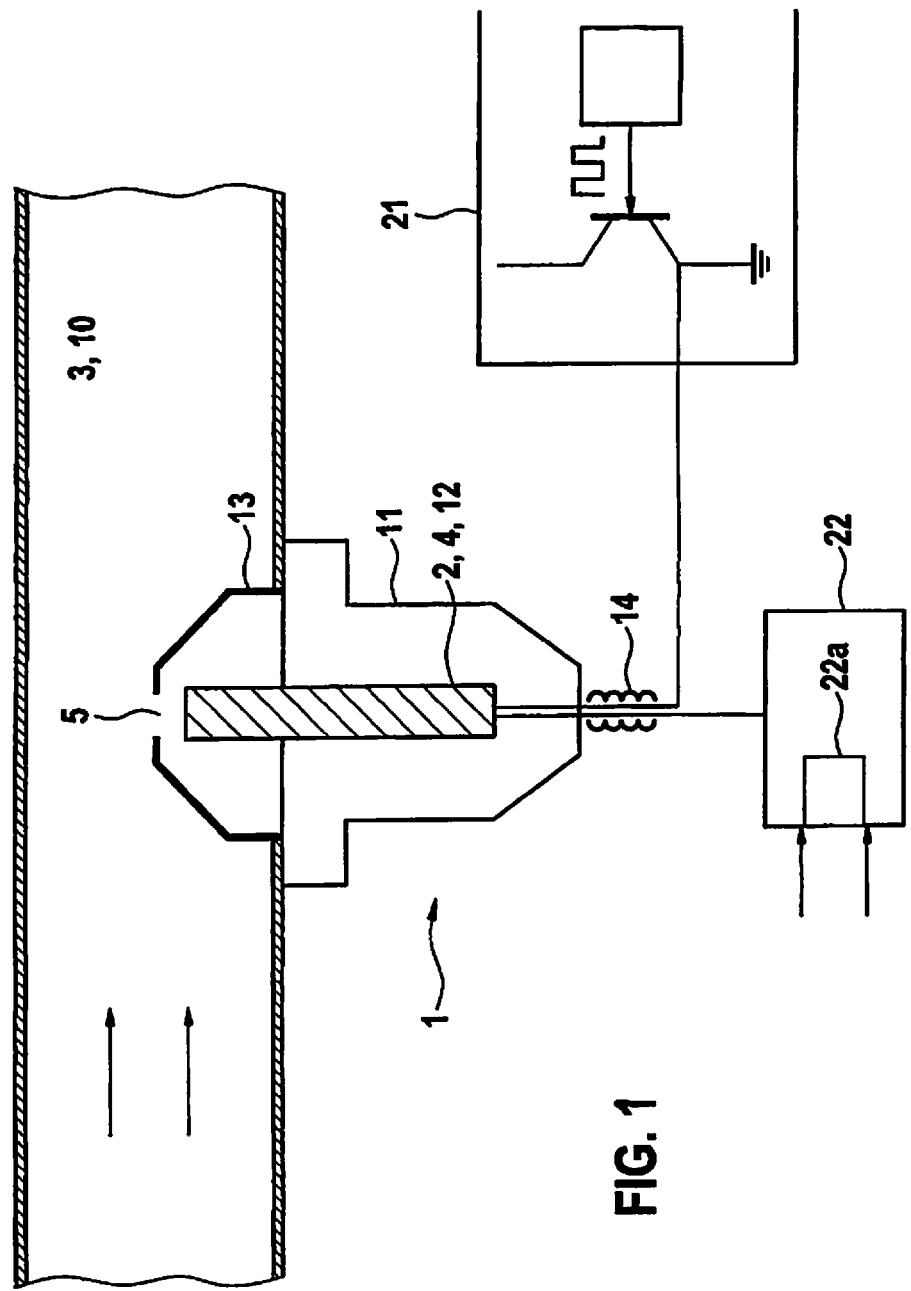
FIG. 1 shows a schematic illustration of an exhaust-gas sensor in an exhaust tract.

FIG. 1 shows a schematic illustration of an exhaust-gas sensor 1 in an exhaust tract 10 of an internal combustion engine of a motor vehicle.

Exhaust-gas sensor 1, for example, may be a particle sensor or a lambda probe. The exhaust-gas sensor encompasses a housing 11, a ceramic sensor element 12, and a sheath tube 13, which has a gas inlet opening 5 on the end face.

Integrated into the ceramic sensor element are a heating device 2 and a device 4 for a temperature measurement, which is based on the evaluation of an electrical resistance of sensor element 12.

Exhaust-gas sensor 1 is electrically contacted via a tight connection 14. In this way, it is in contact with a heating voltage supply 21 on the one side, and with a control and evaluation unit 22 on the other. Control and evaluation unit 22 has additional electronic inputs 22a, which are able to be connected to additional exhaust-gas sensors or additional arithmetic units. For example, information may thereby be available in control and evaluation unit 22 about the exhaust-gas sensor temperature, the ambient temperature, the flow velocity in the environment, the chemical composition of the environment, an amperage and a time characteristic of an electric current flowing through the exhaust-gas sensor, etc.

Heating voltage supply 21 and control and evaluation unit 22 may also be jointly disposed in an exhaust-gas sensor control unit or in an engine control unit.

In this instance, a physical model is furthermore stored in control and evaluation unit 22, with whose aid different heat quantities $Q$ and their time derivatives $\dot{Q}$ may be calculated from the available information. In detail, these are the following quantities:

$\dot{Q}_{supply}$—the heat output supplied by the electric heater,
$\dot{Q}_{dissipation}$—the heat output that is lost due to the various cooling effects,
$\dot{Q}_{HeatStorage}$—the heat output that is stored in the materials of the exhaust-gas sensor by the heat storage capacity of the exhaust-gas sensor.

The heat output $\dot{Q}_{supply}$ is calculated through the electric quantities. $\dot{Q}_{supply}$ is a function of the effective heater voltage and the heater resistance, in the form of $\dot{Q}_{supply} = U_{HeaterEffective}^2 / R_{heater}$. Here, $U_{HeaterEffective}$ the effective value of the heater voltage, which is present as a pulse-width-modulated signal. $R_{heater}$ is the heater resistance. It is taken into account as a function of the exhaust-gas sensor temperature $T_{sensor}$: $R_{Heater} = f(T_{sensor})$.

As an alternative or in addition and depending on the availability of the signals, the heat output that is supplied by the electric heater, $\dot{Q}_{supply}$, may also be determined with the aid of one or more of the following correlations:

$$\dot{Q}_{supply} = I_{HeaterEffective}^2 \cdot R_{heater}$$

$$\dot{Q}_{supply} = U_{HeaterEffective} \cdot I_{HeaterEffective},$$

where $I_{HeaterEffective}$ is the effective heater current.

The thermal output that is lost due to the various cooling effects, $\dot{Q}_{dissipation}$, takes into account the heat dissipation losses (the conduction), the heat convection losses, the heat radiation losses, and electrical losses in the form of $\dot{Q}_{dissipation} = \dot{Q}_{conduction} + \dot{Q}_{convection} + \dot{Q}_{radiation} + \dot{Q}_{ElectricalLosses}$ The heat dissipation losses $\dot{Q}_{conduction}$ are modeled in the form of: $\dot{Q}_{conduction} = f(T_{sensor}, T_{ExhaustPipeWall})$.

The heat convection losses $\dot{Q}_{convection}$ are modeled in the form of: $\dot{Q}_{convection} = f(T_{Sensor}, E_{ExhaustGas}$, Exhaust-gas flow through sheath pipe).

The heat radiation losses $\dot{Q}_{radiation}$ are modeled in the form of: $\dot{Q}_{radiation} = f(T_{Sensor}^4, T_{ExhaustGas}$, Exhaust-gas flow through sheath pipe).

The electrical losses $\dot{Q}_{ElectricalLosses}$ are modeled in the form of: $\dot{Q}_{ElectricalLosses} = f(R_{Heater}, R_{HeaterSupply}, R_{HeaterSwitch}, U_{HeaterEffective})$, where $T_{ExhaustPipeWall}$: the temperature of the exhaust-pipe wall at the location of the exhaust-gas sensor;
$T_{ExhaustGas}$: the exhaust-gas temperature at the location of the exhaust-gas sensor
$R_{HeaterSupply}$: the electrical resistance of the heater supply line;
$R_{HeaterSwitch}$: the electrical resistance of the heater switch.

The quantity $\dot{Q}_{HeatStorage}$ formally occurring as loss is the rate of change of the internal energy or the heat quantity that is stored in the exhaust-gas sensor.

$$Q_{HeatStorage} = C_{Sensor} \frac{dt_{Sensor}}{dt},$$

$C_{Sensor}$ being the heat storage capacity of the exhaust-gas sensor.

An adaptation of the heat storage capacity to its actual value, e.g. in the case of ageing of the exhaust-gas sensor, may be provided.

It is provided that the various heat outputs are compared to one another in a balance equation. In the event that all occurring heat outputs are correctly acquired in the physical model, this balance equation represents the conservation of energy law: $\dot{Q}_{supply}=\dot{Q}_{dissipation}+\dot{Q}_{HeatStorage}$. In this case it may be determined that a monitored event has not occurred. One will also reach the same result if the equation is not exactly but still approximately satisfied.

Another result could be that more heat was supplied to the exhaust-gas sensor than corresponds to the ascertained heat losses: $\dot{Q}_{supply}>\dot{Q}_{dissipation}+\dot{Q}_{HeatStorage}$. In this case, it may be inferred that there is an additional heat loss that was not considered in the model, as may occur as a result of flooding of the exhaust-gas sensor when a motor vehicle is driving through deep water. Especially such an event may be inferred.

It may optionally be provided that the inference of the travel in deep water event takes place only when the discrepancy between the heat quantities supplied to the exhaust-gas sensor and the ascertained heat losses is great and occurs suddenly, for instance by more than 10% or within less than 10 seconds, respectively. In order to ensure a reliable detection of the driving in deep water event, it may be required as an additional, necessary criterion that the dynamic behavior, in particular the change in the physical quantities $\dot{Q}_{suppply}>\dot{Q}_{dissipation}+\dot{Q}_{HeatStorage}$ listed on the two sides of the inequation correlates, and in particular shows a rapid increase in each case.

Another result could be that less heat was supplied to the exhaust-gas sensor than corresponds to the ascertained heat losses: $\dot{Q}_{supply}<\dot{Q}_{dissipation}+\dot{Q}_{HeatStorage}$. In this case, it may be inferred that the heat losses in reality are less than assumed on the basis of the model. In particular, it may be inferred that clogging of a gas inlet opening 5 of exhaust-gas sensor 1 by a solid medium is present. As an additional, necessary criterion for a reliable detection of the clogging event, it may be demanded that the dynamic behavior, especially the change in the physical variables present on the two sides of the inequation, $\dot{Q}_{supply}>\dot{Q}_{dissipation}+\dot{Q}_{HeatStorage}$, does not correlate.

Over the course of the service life, ageing of exhaust-gas sensor 1 takes place, which manifests itself especially by a gradual increase in the actual value of resistance $R_{Heater}$ of its heating device 2. If the previously used value continues to be used in the modeling for calculating heat quantity $\dot{Q}_{supply}$ supplied to the exhaust-gas sensor, then this will result in an incorrect calculation of heat quantity $\dot{Q}_{supply}$ supplied to the exhaust-gas sensor. More precisely, it will be overvalued or undervalued, depending on the manner in which $\dot{Q}_{supply}$ is calculated ($\dot{Q}_{supply}=I_{HeaterEffective}^2 \cdot R_{heater}$ or $\dot{Q}_{supply}=U_{HeaterEffective}^2/R_{heater}$).

In order to improve the method according to the present invention, it may therefore be provided to recognize this ageing, to take it into account and/or to compensate for it.

A consideration of the ageing of exhaust-gas sensor 1 may be realized in that on the basis of empirical values, model parameters for calculating a heat quantity supplied to exhaust-gas sensor 1 and/or withdrawn from exhaust-gas sensor 1, especially a parameter that describes a heater resistance $R_{heater}$, is/are gradually modified over the service life of exhaust-gas sensor 1. For example, corrections of this type may take place as a function of the operating hours of exhaust-gas sensor 1. As the case may be, certain operating conditions of exhaust-gas sensor 1, such as the temperature and/or a similar condition, may be taken into account in addition.

As an alternative but also completely in the sense of the present invention, a detection of the ageing of exhaust-gas sensor 1 may also take place with the aid of a method in which it is determined whether ageing of exhaust-gas sensor 1, in particular a rise in heater resistance $R_{heater}$, has taken place. This determination is carried out by analyzing at least one heat quantity supplied to exhaust-gas sensor 1 during a time period and/or a heat quantity withdrawn from exhaust-gas sensor 1 during the particular time period, in particular under consideration of a change in the heat quantity stored by exhaust-gas sensor 1 during the time period.

For example, this may be done by comparing the heat losses $\dot{Q}_{dissipation}+\dot{Q}_{HeatStorage}$ with modeled heat output $\dot{Q}_{supply}$ across a certain period of time, in particular across a longer period of time, such as at least 100 s. If a permanent deviation comes about between the heat losses $\dot{Q}_{dissipation}+\dot{Q}_{HeatStorage}$ and modeled heat output $\dot{Q}_{supply}$, then it may be inferred that ageing of exhaust-gas sensor 1, in particular an increase in heater resistance $R_{heater}$, has taken place.

Additional criteria may be utilized in order to be able to reliably distinguish between the case of "ageing of the exhaust-gas sensor" and the cases of "driving through deep water" and/or clogging of the sheath tube.

For example, the inference of an aged exhaust-gas sensor 1 is particularly only permitted if a deviation between the heat losses $\dot{Q}_{dissipation}+\dot{Q}_{HeatStorage}$ and modeled heat output $\dot{Q}_{supply}$ occurs gradually, e.g., by at most a few percent across 100 operating hours. In the case of deep water driving, on the other hand, a deviation between heat losses $\dot{Q}_{dissipation}+\dot{Q}_{HeatStorage}$ and modeled heat output $\dot{Q}_{supply}$ takes place within a very short period of time, for example within a few seconds. In addition or as an alternative, it may be provided that the inference of an aged exhaust-gas sensor 1 is permitted only if the deviation also occurs in situations in which driving through deep water is physically impossible, e.g., at a high vehicle speed of at least 50 km/h, for example.

In addition or as an alternative, it may also be provided that the inference of an aged sensor is not permitted especially if a marked dependency of the deviation between the heat losses $\dot{Q}_{dissipation}+\dot{Q}_{HeatStorage}$ and the modeled heat output $\dot{Q}_{supply}$ from the exhaust-gas velocity at the location of exhaust-gas sensor 1 is noticeable. In this case, one may possibly also assume clogging of a gas inlet opening 5 of exhaust-gas sensor 1 by a solid medium.

After ageing of exhaust-gas sensor 1 has been detected, such ageing may be taken into account by an adequate adaptation of a model parameter for the calculation of a heat quantity supplied to exhaust-gas sensor 1 and/or withdrawn from exhaust-gas sensor 1, in particular a parameter that describes a heater resistance $R_{heater}$.

Whether the equation $\dot{Q}_{supply}=\dot{Q}_{dissipation}+\dot{Q}_{HeatStorage}$ has been satisfied with sufficient accuracy, or in other words, only small and/or only brief deviations occur, or whether deviations permit the conclusion that certain events have occurred or may have occurred as a function of additional criteria, can then for one be inferred from the absolute amount of the deviation that has occurred.

However, such a measure is tainted by error since the magnitude of the deviation may be subject to external conditions to which exhaust-gas sensor 1 is exposed (such as the exhaust-gas temperature, exhaust-tract wall temperature, exhaust-gas velocity, exhaust-gas acceleration, and exhaust-gas mass flow); it may furthermore depend on operating conditions of exhaust-gas sensor 1 (e.g., the sensor temperature, the voltage duty cycle of the sensor heater, the sensor voltage).

An objective measure for whether the equation $\dot{Q}_{supply} = \dot{Q}_{dissipation} + \dot{Q}_{HeatStorage}$ has been satisfied with sufficient accuracy may be provided as follows:

The variable $\Delta\dot{Q}_{deviation}$ is calculated from $\Delta\dot{Q}_{deviation} = (\dot{Q}_{dissipation} + \dot{Q}_{HeatStorage})_{modeled} \cdot \dot{Q}_{supply}$ and may have a negative or a positive algebraic sign.

An amplified and energetically normalized measure $\Delta\dot{Q}_{deviation, amplified, normalized}$ is formed:

$$\Delta\dot{Q}_{deviation,amplified,normalized} = \frac{\Delta\dot{Q}_{deviation}^2}{(\dot{Q}_{dissipation} + \dot{Q}_{HeatStorage})_{modeled}}$$

This is applied to certain periods of time through time integration and time normalization:

$$\Delta Q_{deviation,amplified,normalized} = \int_{t_1}^{t_2} \Delta\dot{Q}_{deviation,amplified,normalized} \cdot dt$$

$$\Delta\dot{Q}_{deviation,amplified,normalized,time-normalized} = \frac{\Delta Q_{deviation,amplified,normalized}}{\Delta t}$$

where $\Delta t = (t_a - t_1) + (t_c - t_b) + (t_e - t_d) + \ldots + (t_2 - t_f)$ and $[t_1, t_2] = \{[t_1, t_a], [t_b, t_c], [t_d, t_e] \ldots [t_f, t_2]\}$ As such an objective measure $\Delta\dot{Q}_{obj}$: $\Delta\dot{Q}_{deviation, amplified, normalized, time-normalized}$ may already be used. In order to obtain better robustness, it is also possible to form a mean value across a multitude of time raster samples:

$$\Delta Q_{deviation,amplified,normalized,time-normalized,mean-value} = \frac{\int_{t_1}^{t_2} \Delta\dot{Q}_{deviation,amplified,normalized,time-normalized} \cdot dt}{\text{number of time raster samples}(\Delta t)}$$

The objective measure $\Delta\dot{Q}_{obj}$ obtained in this manner is finally also compared to a predefined threshold in order to determine in an objective manner whether or not the monitored event has occurred.

Figure 2:
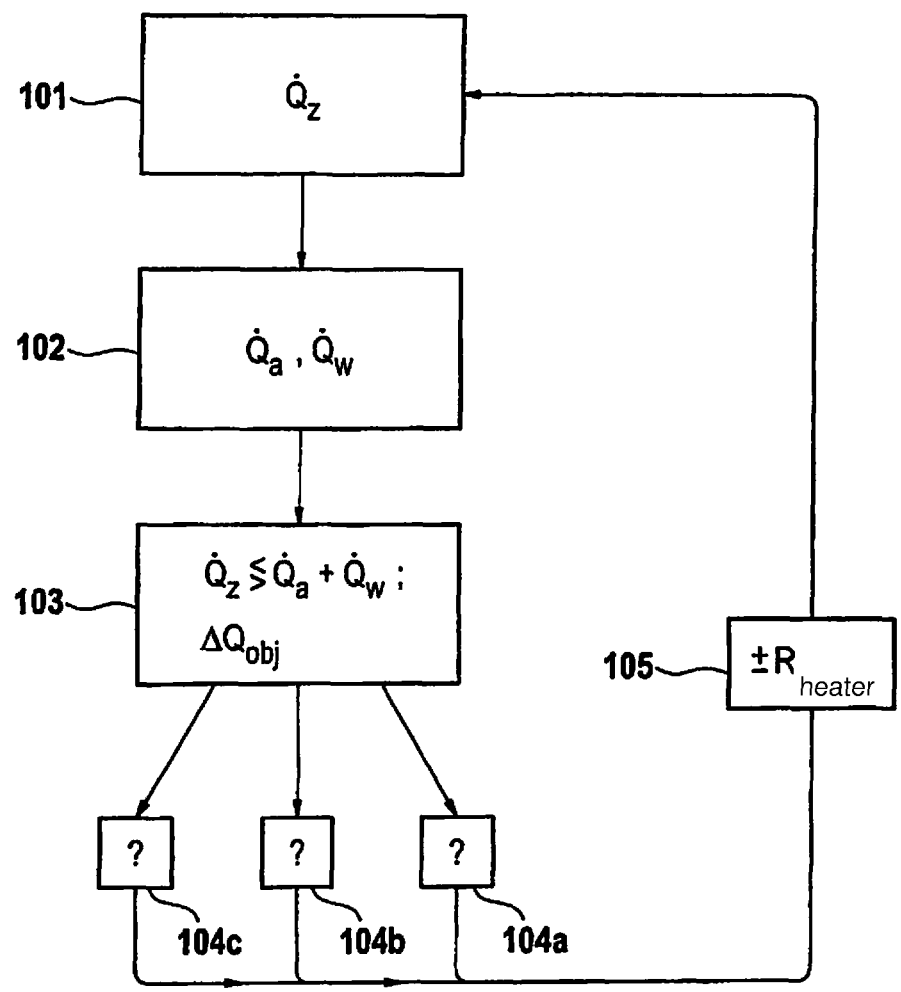
FIG. 2 shows a flow diagram of a specific embodiment of the method according to the present invention.

FIG. 2 once again shows steps of the method according to the present invention by way of example. In a first step 101, an electrical heat output $\dot{Q}_z$ of exhaust-gas sensor 1 is detected. In a second step 102, heat quantities $\dot{Q}_a$ withdrawn from exhaust-gas sensor 1, a change in heat quantity $\dot{Q}_w$ stored by exhaust-gas sensor 1 are detected. In a third step 103, a comparison of the neat quantities takes place. In addition, as already outlined, an objective measure $\Delta\dot{Q}_{obj}$ is calculated, which describes to what extent the equation $\dot{Q}_{supply} = \dot{Q}_{dissipation} + \dot{Q}_{HeatStorage}$ is satisfied or to what extent deviations are present.

In the following text, on the basis of the comparison, and possibly under consideration of additional criteria and possibly under consideration of objective measure $\Delta\dot{Q}_{obj}$ and a predefined value, as described earlier, a decision is made in steps 104a and 104b and 104c as to whether or not clogging of sheath tube 13 is present; in addition or as an alternative, it is decided whether or not flooding of exhaust-gas sensor 1 is present. In addition or as an alternative, it is determined whether ageing of exhaust-gas sensor 1 has occurred. The method may subsequently begin again at step 101. If warranted, especially in the event that sensor ageing was previously determined, an adaptation of model parameters, especially a parameter that describes a heater resistance $R_{heater}$, may be implemented in step 105.

What is claimed is:

1. A method for monitoring an exhaust-gas sensor, comprising:
    evaluating at least one heat quantity at least one of: (i) supplied to the exhaust-gas sensor during a period of time, and (ii) withdrawn from the exhaust-gas sensor during the period of time, under consideration of a change in the heat quantity stored by the exhaust-gas sensor that takes place during the period of time; and
    determining whether at least one monitored event has occurred based on the evaluating,
    wherein the following heat quantities are ascertained and considered separately from one another during or prior to the evaluation:
    a heat dissipation between the exhaust-gas sensor and an environment of the exhaust-gas sensor,
    a heat convection between the exhaust-gas sensor and the environment of the exhaust-gas sensor, and
    a heat radiation between the exhaust-gas sensor and the environment of the exhaust-gas sensor, and a sum of the heat quantities, and wherein a change in the heat quantity stored by the exhaust-gas sensor taking place during the time period, is compared with a heat output of an electric heating device of the exhaust-gas sensor, and it is determined on this basis whether the at least one monitored event has occurred.

2. The method as recited in claim 1, wherein the evaluation takes place one of: (i) with the aid of an energy balance equation, (ii) with the aid of the conservation of energy law, (iii) with the aid of a time derivative of the energy balance equation, or (iv) with the aid of the time derivative of the conservation of energy law.

3. The method as recited in claim 1, wherein the heat quantities are at least partially ascertained based on a physical model of the exhaust-gas sensor and the environment of the exhaust-gas sensor, and the occurrence of the monitored event is not taken into account in the physical model.

4. The method as recited in claim 1, wherein the exhaust-gas sensor has a heating device and a device for a temperature measurement.

5. The method as recited in claim 1, wherein the at least one monitored event is flooding of the exhaust-gas sensor by a fluid medium.

6. The method as recited in claim 1, wherein the at least one monitored event is a clogging of a gas inlet opening of the exhaust-gas sensor by a solid medium.

7. The method as recited in claim 1, wherein the at least one monitored event is ageing of the exhaust-gas sensor.

8. The method as recited in claim 1, wherein in the case of ageing of the exhaust-gas sensor, model parameters for the calculation of a heat quantity at least one of: (i) supplied to the exhaust-gas sensor, and (ii) withdrawn from the exhaust-gas sensor, are adapted, the model parameters including a heater resistance.

9. The method as recited in claim 1, wherein the evaluation as to whether the at least one monitored event has occurred takes place based on a comparison of a predefined value with a measure that is obtained by a time integration over a heat output.

10. A non-transitory electronic storage medium on which is stored a computer program for monitoring an exhaust-gas sensor, the computer program, when executed by a control unit, causing the control unit to perform:

evaluating at least one heat quantity at least one of: (i) supplied to the exhaust-gas sensor during a period of time, and (ii) withdrawn from the exhaust-gas sensor during the period of time, under consideration of a change in the heat quantity stored by the exhaust-gas sensor that takes place during the period of time; and determining whether at least one monitored event has occurred based on the evaluating, wherein the following heat quantities are ascertained and considered separately from one another during or prior to the evaluation:

a heat dissipation between the exhaust-gas sensor and an environment of the exhaust-gas sensor, a heat convection between the exhaust-gas sensor and the environment of the exhaust-gas sensor, and a heat radiation between the exhaust-gas sensor and the environment of the exhaust-gas sensor, and a sum of the heat quantities, and wherein a change in the heat quantity stored by the exhaust-gas sensor taking place during the time period, is compared with a heat output of an electric heating device of the exhaust-gas sensor, and it is determined on this basis whether the at least one monitored event has occurred.

11. An electronic control unit which includes an electronic storage medium on which is stored a computer program for monitoring an exhaust-gas sensor, the computer program, when executed by the electronic control unit, causing the electronic control unit to perform:

evaluating at least one heat quantity at least one of: (i) supplied to the exhaust-gas sensor during a period of time, and (ii) withdrawn from the exhaust-gas sensor during the period of time, under consideration of a change in the heat quantity stored by the exhaust-gas sensor that takes place during the period of time; and determining whether at least one monitored event has occurred based on the evaluating, wherein the following heat quantities are ascertained and considered separately from one another during or prior to the evaluation:

a heat dissipation between the exhaust-gas sensor and an environment of the exhaust-gas sensor, a heat convection between the exhaust-gas sensor and the environment of the exhaust-gas sensor, and a heat radiation between the exhaust-gas sensor and the environment of the exhaust-gas sensor, and a sum of the heat quantities, and wherein a change in the heat quantity stored by the exhaust-gas sensor taking place during the time period, is compared with a heat output of an electric heating device of the exhaust-gas sensor, and it is determined on this basis whether the at least one monitored event has occurred.

\* \* \* \* \*